(12) United States Patent
Herrmann

(10) Patent No.: US 12,385,718 B1
(45) Date of Patent: Aug. 12, 2025

(54) LOCKING PIN FOR USE IN AN ADJUSTABLE BUTTSTOCK

(71) Applicant: Vamco, LLC, Albuquerque, NM (US)

(72) Inventor: Gregory Herrmann, Albuquerque, NM (US)

(73) Assignee: VAMCO, INC, Albuquerque, NM (US)

( * ) Notice: Subject to any disclaimer, the term of this patent is extended or adjusted under 35 U.S.C. 154(b) by 0 days.

(21) Appl. No.: 18/776,960

(22) Filed: Jul. 18, 2024

Related U.S. Application Data

(60) Provisional application No. 63/527,682, filed on Jul. 19, 2023.

(51) Int. Cl.
*F41C 23/14* (2006.01)
*F16B 39/28* (2006.01)

(52) U.S. Cl.
CPC .............. *F41C 23/14* (2013.01); *F16B 39/28* (2013.01)

(58) Field of Classification Search
CPC ........... F41C 23/14; F16B 39/28; F16B 39/24
See application file for complete search history.

(56) References Cited

U.S. PATENT DOCUMENTS

| | | |
|---|---|---|
| 3,348,328 A | 10/1967 | Roy |
| 10,830,558 B2 | 11/2020 | Underwood et al. |
| 11,105,582 B1 | 8/2021 | Spuhr |
| 2015/0052795 A1* | 2/2015 | Burke ..................... F41C 23/04 42/71.01 |
| 2016/0061560 A1* | 3/2016 | Saadon ..................... F41G 1/35 42/72 |
| 2021/0018296 A1 | 1/2021 | Faifer |
| 2021/0254928 A1 | 8/2021 | Raymond |
| 2023/0304771 A1 | 9/2023 | Miller et al. |
| 2024/0053120 A1 | 2/2024 | Kusnierz |
| 2024/0328749 A1 | 10/2024 | McCarthy |
| 2025/0093127 A1* | 3/2025 | Palmer .................... F41C 23/04 |

* cited by examiner

*Primary Examiner* — J. Woodrow Eldred
(74) *Attorney, Agent, or Firm* — Rod D. Baker

(57) ABSTRACT

A locking pin assembly for use with an adjustable buttstock of a firearm. The locking pin assembly, in cooperation with an adjustable buttstock, may be used to permit a buttstock to be collapsed or extended in relation to a firearm's receiver. The locking pin assembly engages with the body and release lever of the buttstock to provide for their operative connection. The locking pin assembly is easily fabricated and used.

20 Claims, 11 Drawing Sheets

LOCKING PIN FOR USE IN AN ADJUSTABLE BUTTSTOCK

CROSS-REFERENCE TO RELATED APPLICATIONS

This application claims the benefit of the filing of U.S. Provisional Patent Application Ser. No. 63/527,682 titled "Locking Pin for Use in an Adjustable Buttstock," filed on Jul. 19, 2023, which application is incorporated fully herein by reference.

BACKGROUND OF THE INVENTION

Field of the Invention

This invention relates generally to adjustable buttstocks for firearms, and specifically to a locking pin assembly usable with a collapsible/adjustable buttstock.

Background of the Invention

Firearms, particularly but not limited to long rifles, may feature, or be adapted to include, adjustable buttstocks. An adjustable buttstock permits the length of a rifle (more specifically the distance from the trigger to the rifle butt) to be selectively changed to accommodate the size of the individual user, or to suit the circumstance in which the firearm is being used.

Strictly speaking, there is a difference between a "collapsible" buttstock and a buttstock that is "adjustable." In firearms usage, the "length of pull" is the distance from the trigger to the buttplate at the end of a long gun's stock; it is the space the user's arm must wrap around the gun to place the trigger hand in a firing position on the gun. "Collapsible" buttstocks can only adjust the length of pull. The user can collapse or extend the stock for a more comfortable firing stance, because of arm length, or other reasons. "Adjustable" buttstocks adjust in ways other than merely length of pull, and may have, for instance, a cheek riser or adjustable butt padding. Thus, adjustable stocks are meant to be adjusted in several ways including but not limited to length of pull and cheek risers. Nevertheless, many people use terms like adjustable, collapsible, and telescoping interchangeably when speaking of buttstocks. For purposes of this disclosure and the claims, "adjustable buttstock" is assigned a broad meaning to include both truly adjustable buttstocks as well as those that are merely collapsible.

Thus, for example, an adjustable buttstock may be controllably shortened to promote comfortable/proper use by a person of a smaller stature, and may be extended for use by a larger person. Also, an adjustable buttstock permits the firearm's length of pull to be modified by a single user as he or she alters shooting position or posture (e.g., shooting from a standing position versus while kneeling or sitting). Changing shooting positions often affects eye relief, that is, the need for the user's aiming eye to be in the "right spot" relative to the firearm's scope or other gunsight(s) when he shoulders the rifle-which can be accommodated by adjusting a buttstock. Thus, most adjustable buttstocks feature assemblies permitting the stock position to be selectively and temporarily secured in any of several positions, and releasably locked in a desired position while the firearm is in use, and collapsed to a minimum length when the firearm is transported or stored.

Adjustable buttstocks have been known for at least fifty years, and many of their general forms and functions have changed only modestly over that time. Many innovations have involved exploiting improved material compositions, such as enhanced polymers, metal alloys, and composites, used in the stock itself. An early adjustable buttstock disclosure providing useful background for the present invention is U.S. Pat. No. 3,348,328 to Roy, which is incorporated herein by reference. Most adjustable buttstock assemblies include, as seen in the patent to Roy, a handle or release lever attached to a sliding buttstock using an axially movable locking pin assembly having a locking pin spring, and some means for securing the locking pin assembly for reciprocal movement (under the influence of the release lever and the locking pin spring) within the overall buttstock assembly in use. In U.S. Pat. No. 3,348,328, the means for securing the lock pin assembly include a nut having a threaded engagement with the lock pin, accompanied by a roll pin for securing the nut against rotation relative to the lock pin. Further developments in adjustable buttock assemblies have tended mostly to be improvements upon the fundamentals disclosed in this patent to Roy.

An example of the current state of the art of adjustable buttstock assemblies is U.S. Pat. No. 10,830,558 to Underwood et al. All teachings of U.S. Pat. No. 10,830,558 are incorporated herein by reference. Underwood purports to improve upon the prior art by providing a locking pin assembly that is simplified by, among other things, eliminating the use of a roll pin (such as the roll pin featured in the patent to Roy). Underwood nevertheless teaches a locking pin assembly that requires complex machining techniques (particularly features defined in the interior of the axial aperture through its lock pin nut) and relatively expensive (e.g., all-metal) component materials.

There remains an unmet need for a locking pin assembly that is affordably fabricated, including the potential use of non-metal parts, and yet is durable while also being easy to use.

BRIEF DESCRIPTION OF THE DRAWINGS

The attached drawings, which form part of this disclosure, are as follows.

Like reference numerals identify like elements in the several views. The drawings are not necessarily to scale, either within a view or between views.

DESCRIPTION OF THE INVENTION

Figure 1:
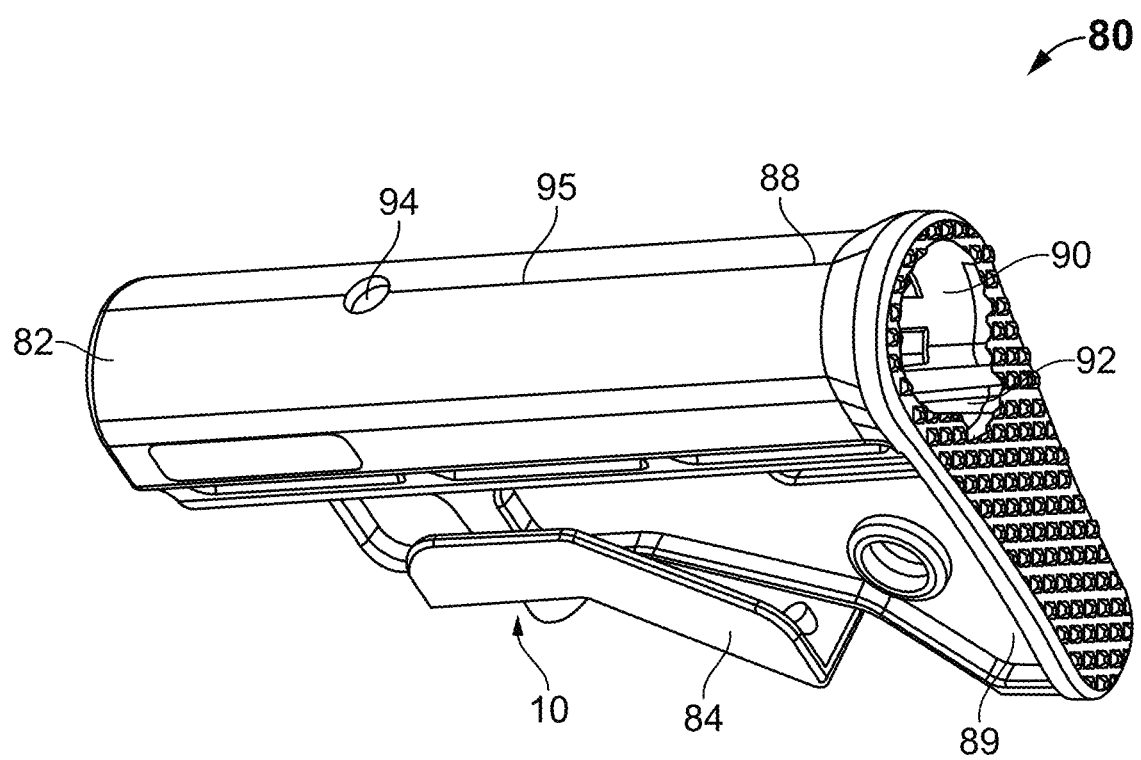
FIG. 1 is a perspective side view, from the rear, of an adjustable buttstock assembly useable according to the present invention.

There is disclosed hereby a locking pin assembly for cooperative use in an adjustable buttstock of a firearm, for example a rifle or carbine. Adjustable buttstocks are popularly deployed on the AR-15 types of rifles, for instance. The presently disclosed locking pin assembly is manufactured more affordably than assemblies known in the art. Further, the assembly of the locking pin assembly itself, and its installation in a buttstock, is simplified relative to the prior art.

As explained in, for example, U.S. Pat. No. 10,830,558, adjustable buttstocks are controllably slidable or shiftable to-and-fro relative to the body of the firearm's receiver. The use position of the buttstock can be regulated and temporarily set by a means for releasably locking the buttstock in different positions—typically a range of at least several incrementally different positions. The means for releasably locking often includes a handle or release lever or pivotal grip attached to the shiftable buttstock using a locking pin assembly. By manually depressing the release lever, the user can disengage a locking pin from any of a series of apertures or notches in a receiver extension (a rigid tube, sometimes called a "buffer tube," extending rearwardly from the rifle receiver) to free the buttstock for adjustable movement along the tube. The user then can slidably re-position the buttstock as desired (and to align the locking pin with a corresponding recess (e.g., aperture or notch) in the receiver extension tube). Upon the user's manually releasing the lever, the action of the locking pin spring pushes the locking pin into an extension tube recess or groove to re-lock temporarily the buttstock against sliding motion along the receiver extension.

The present invention is of an improved locking pin assembly. The apparatus of the assembly is suitable for use, or can be adapted for use, in many types and kinds of known and future adjustable buttstock assemblies. The locking pin assembly described hereinafter is an improved alternative to the locking pin assemblies known in the art and as generally explained hereinabove. Among other things, the present invention fills a problem or unmet need for a locking pin assembly that is affordably manufactured, including the need to minimize complex machining of metal components, as well as the need to advantageously fashion or mold selected parts of the assembly from plastic polymers or composite materials. In the present invention, the main locking pin preferably is made of metal, but it does not require sophisticated or complicated milling or shaping. Components with any relative complexity of shape may be fabricated from non-metals.

Reference is initially made to FIGS. 1-4 illustrating a typical adjustable buttstock assembly 80. The buttstock assembly 80 has two principal components, the body 82 and a handle-like release lever 84. Most modern buttstocks, including both the main body 82 and the release lever 84, are fashioned from polymers, aluminum, composite materials (such as fiberglass, carbon fiber, or Kevlar), or combinations thereof.

The overall configuration of a buttstock body 82 for use with the instant invention is generally according to the known art. As seen in FIGS. 1-4, the main body 82 includes an upper portion 88 and a lower portion 89 (the two portions ordinarily integrally molded, machined, or otherwise fabricated as a unit). The upper portion 88 defines therein, along most or all its axial length, a tube-like extension tunnel 90 for slidably receiving coaxially therein the rifle's receiver extension (not shown) as well-known in the art. The tunnel 90 ordinarily defines a mostly cylindrical inner wall. The tunnel 90 preferably has a bottom channel or groove 92 along its bottom wall, which groove may be incrementally interrupted along its length by spaced detents or recesses. The buttstock body 82 also defines buttstock top hole 94 that penetrates the body from its upper surface 95 to and into the interior of tunnel 90. The buttstock top hole 94 facilitates the installation of the inventive locking pin assembly 10 in the overall buttstock assembly 80, as shall be further described. A complete locking pin assembly 10, including its locking pin spring, is seen in FIGS. 1-4 functionally installed within the full buttstock assembly 80.

The release lever 84 in a side view is typically shaped generally in the form of a broadly flattened, inverted "V." It contacts a lower surface 96 of the body 82, and is pivotal or rockable in relation thereto. A buttstock locking pin assembly 10 (FIGS. 5-19) according to the present invention is used to attach the release lever 84 to the buttstock body 82. More specifically, the locking pin 20 engages operatively with a release lever arm 86 of the release lever 84. When the release lever 84 is attached beneath the body 82 by means of the locking pin assembly 10, upward pressure against the release lever handle 85 causes the lever 84 to pivot about its apex 87. This pivotal movement draws the release lever arm 86 downward (in FIGS. 1-4) away from the lower surface 96 of the body 82, and against the action of a spring 40 of the locking pin assembly in a manner further to be described. The release lever 84 thus acts as a sort of cam mechanism which converts pivotal motion of the release lever 84 (with its apex 87 rocking against a lower surface of the body 82) to a translation (and reciprocating) motion of the locking pin 20 of the locking pin assembly 10.

Figure 5:
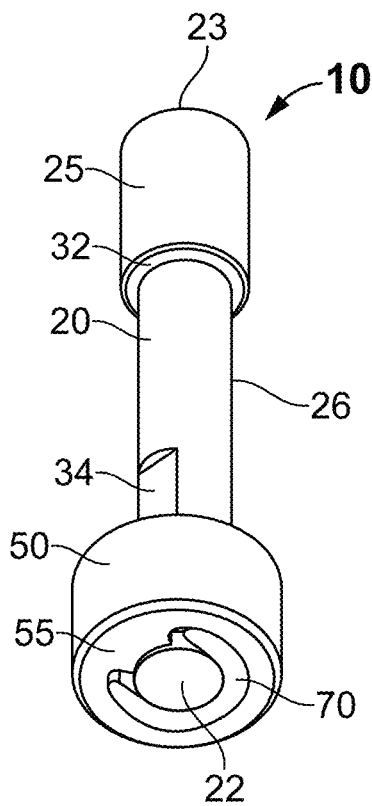
FIG. 5 is a bottom perspective view of an embodiment of a locking pin assembly according to the present invention, with a spring component omitted from the view for clarity.
Figure 6:
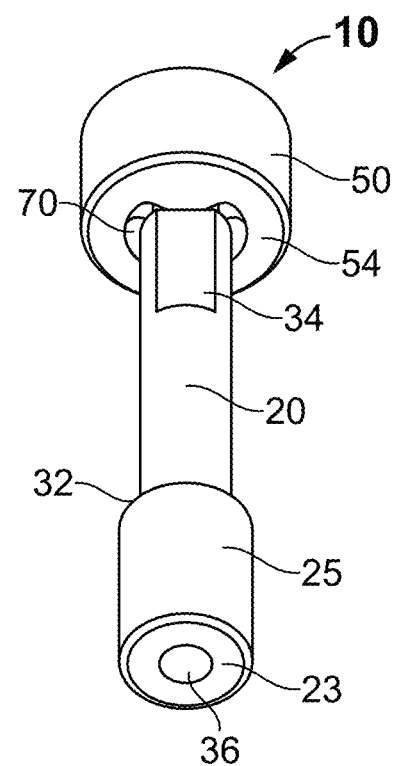
FIG. 6 is a top perspective view of the locking pin assembly seen in FIG. 5.
Figure 7:
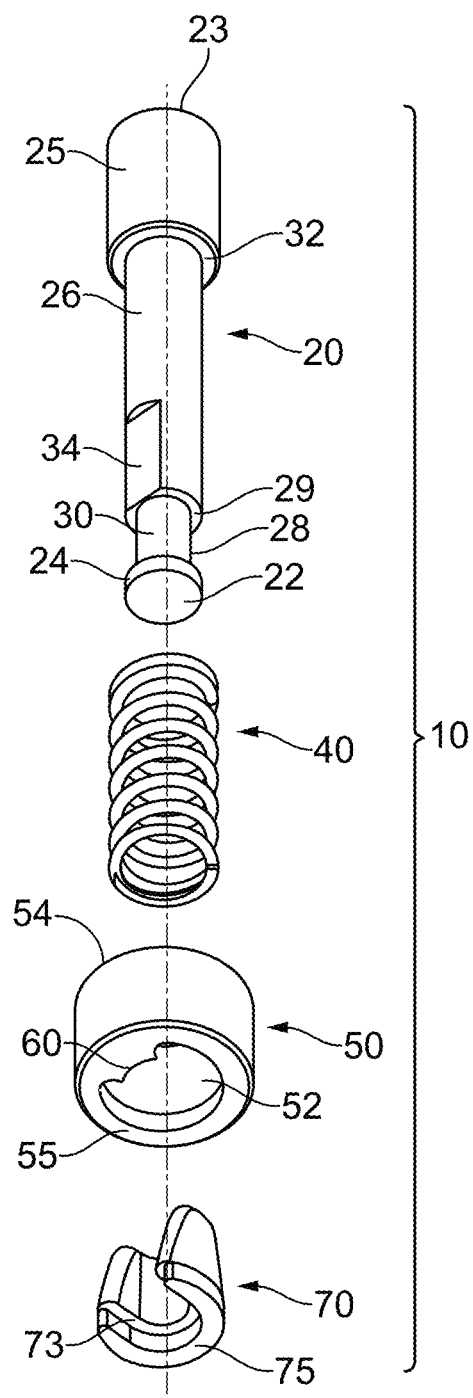
FIG. 7 is a perspective exploded view, from below, of a preferred embodiment of the locking pin assembly, including a compression spring component, according to the present invention.
Figure 17:
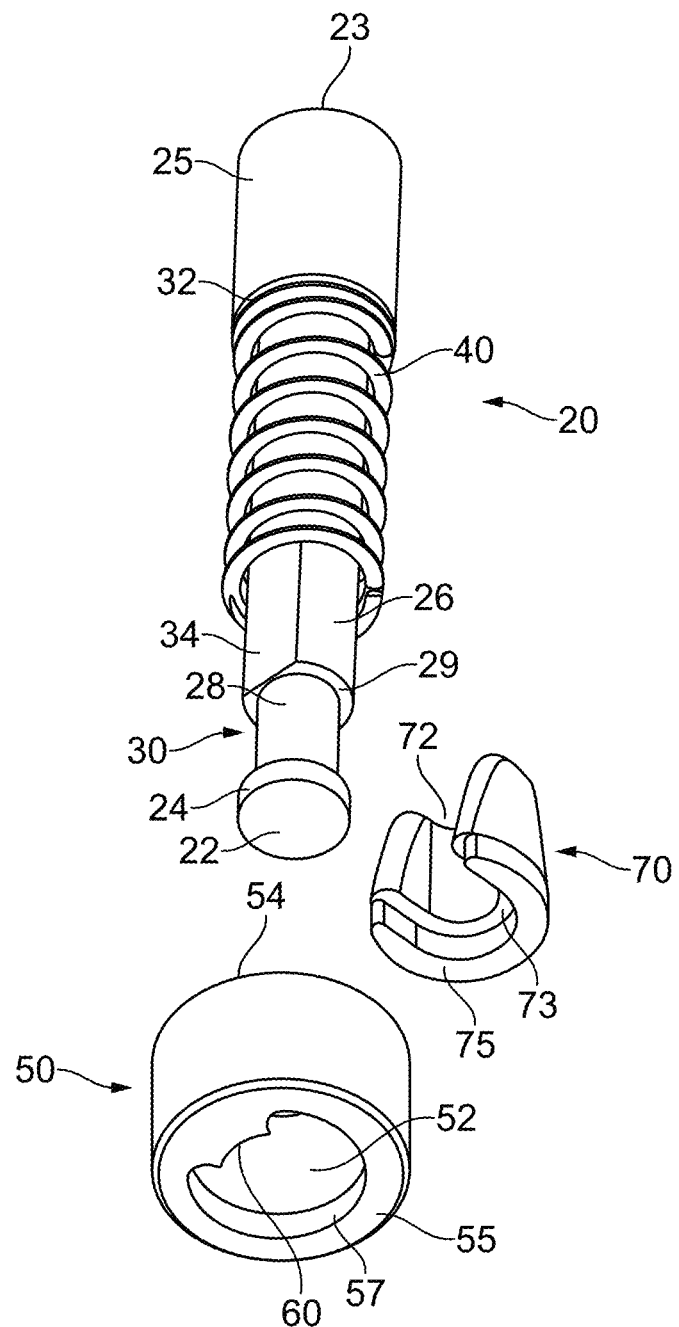
FIG. 17 is a perspective bottom view of the locking pin assembly shown in a first condition prior to complete assembly.
Figure 18:
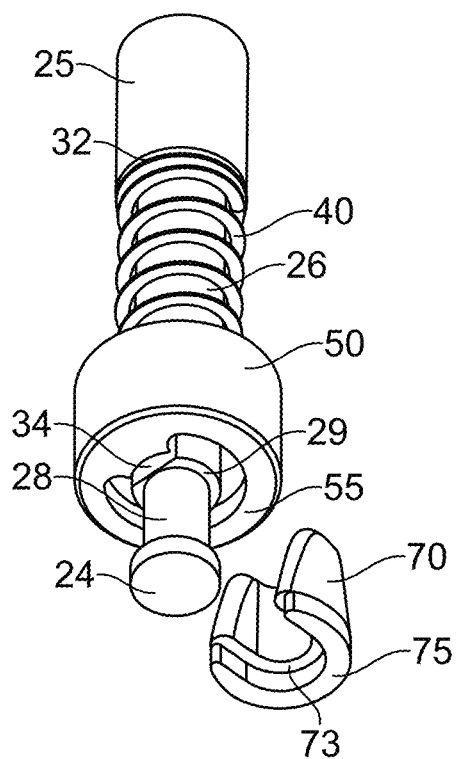
FIG. 18 is a perspective bottom view of the locking pin assembly according to FIG. 17, in a second condition of assembly.
Figure 19:
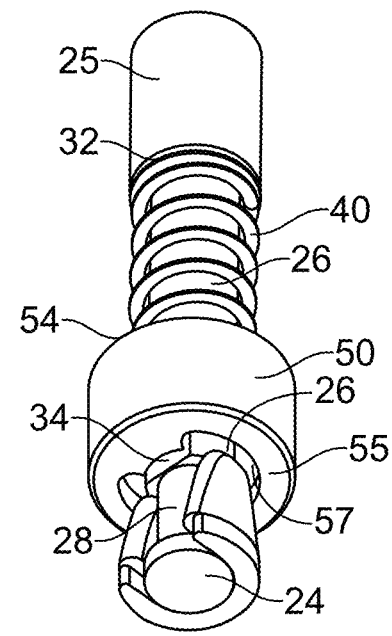
FIG. 19 is a perspective view of the locking pin assembly according to FIG. 18, in a third condition of assembly.

Combined reference is made to FIGS. 5-7, showing components of a preferred embodiment of a locking pin assembly according to the invention. The adjustable buttstock locking pin assembly 10 includes, in one embodiment, a locking pin 20, a spring 40 (FIG. 7) a ferrule 50, and a C-clip 70. The locking pin 20 preferably but not necessarily is composed of a suitable steel alloy. It is observed from FIG. 7 that a steel pin 20 has comparatively simple exterior contours and features which are readily machined. The spring 40 preferably is a helical compression spring, which also may be fabricated from a metal alloy, locatable coaxially around the pin 20. In the preferred embodiment of the locking pin assembly 10, the ferrule 50 and C-clip 70 are fabricated from a polymer, such as a high-impact Nylon, also known as toughened Nylon, made of Nylon 66 or Nylon 6. In one preferred embodiment, the ferrule 50 and/or the C-clip are composed of a 33% glass-filled Nylon composition. Other compositions, including other suitably durable amide polymers, may be adapted. FIGS. 5 and 6 show the locking pin assembly 10 when fully assembled, except that the spring 40 is omitted from these views to simplify the illustration. FIGS. 5 and 6 also show that when the locking pin assembly 10 is fully assembled for use, the C-clip 70 partially surrounds circumferentially one end of the locking pin 20 while the ferrule 50 encloses circumferentially the C-clip 70, all in a manner to be further explained. Reference also to FIGS. 17-19 suggests that when the locking pin assembly 10 is assembled, the ferrule 50 can hold the spring 40 in place on and around the stem of the locking pin 20, while the C-clip 70 maintains the ferrule 50 in place upon the locking pin.

The adjustable buttstock locking pin 20 is plainly depicted in FIGS. 5-7. Locking pin 20 preferably is an integral unit machined from a single piece of metal alloy, and may be, for example, approximately 4.5 cm long. The pin 20 has a first end 22 and a second end 23. On the first end 22 is a solid head 24, preferably discoid in shape having a diameter of about 6 mm and (for example) about 2 mm thick axially. "Discoid" means having the form of a flat and circular discus having a diameter exceeding its axial thickness or length. On the second end 23 is a cap 25 which preferably is cylindrical and may be, by way of example only, about 1.0 cm in axial length with a diameter (for example, not by limitation) of about 8 mm. Extending between and joining the discoid head 24 and cap 25 is a stem preferably including a cylindrical major shaft 26 coaxially integral with a cylindrical minor shaft 28. In a preferred embodiment, the stem of the locking pin 20 features the major shaft 26 having a diameter (e.g., approximately 6.0 mm) that is greater than the diameter (e.g., approximately 4.0 mm) of the stem's minor shaft 28. The diametrical transition between the two shafts 26, 28 defines a step 29. The minor shaft 28, the step 29, and the upper or inside surface of the discoid head 24 thus define a circumferential clip channel 30. The diametrical transition between the major shaft 26 and the cap 25 defines an annular seat 32 upon which an end of the spring 40 may be received. For ease of machine fabrication, the major shaft 26 and the head 24 preferably have approximately the same diameter. The outside diameter of the helix of the spring 40 typically is equal to or slightly less than the outside diameter of the cap 25. On the major shaft 26 is a planar surface defining a keyway 34 extending a distance (e.g., approximately 9 mm) from the step 29 toward the seat 32. The keyway 34 is operatively engageable with the ferrule 50 in a manner to be further described. Optionally but preferably there is in the first end 22, such as in the center of the cap 25, a tool aperture 36 for facilitating manipulation of the pin 20 with a thinly tipped tool (not shown).

Figure 8:
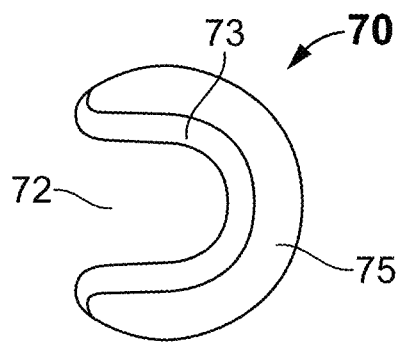
FIG. 8 is a bottom view of a C-clip component of a preferred embodiment of the locking pin assembly.
Figure 9:
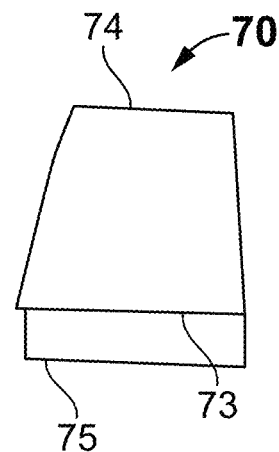
FIG. 9 is a side view of the C-clip component seen in FIG. 8.
Figure 10:
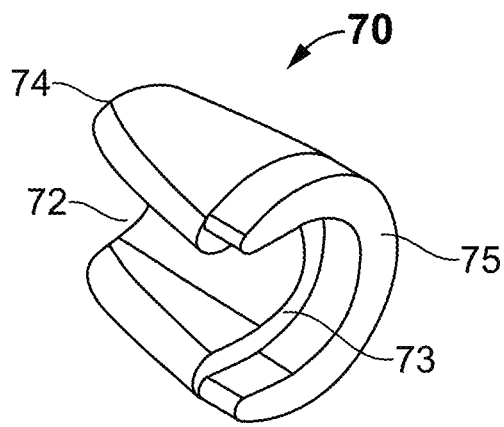
FIG. 10 is a perspective bottom view of the C-clip component.
Figure 11:
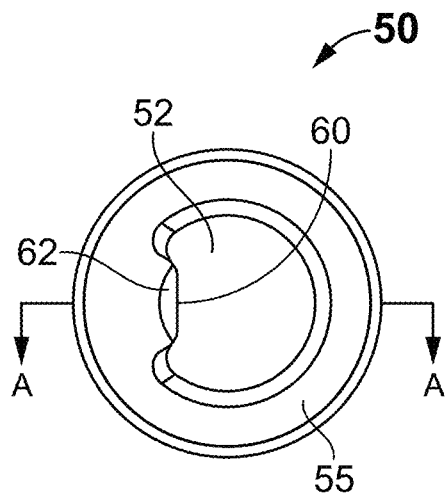
FIG. 11 is a bottom view of a ferrule component of a preferred embodiment of the locking pin assembly.
Figure 12:
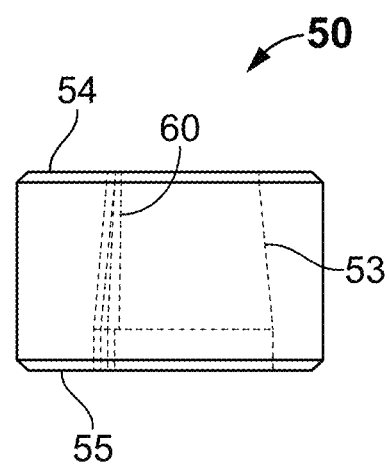
FIG. 12 is a side view of the ferrule component seen in FIG. 11, with phantom lines showing interior features.
Figure 13:
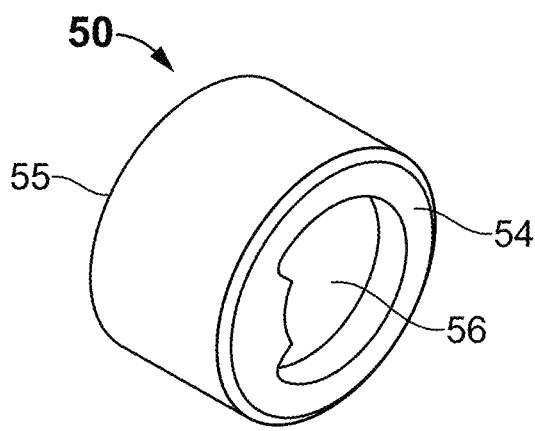
FIG. 13 is a perspective view of the top of the ferrule component.
Figure 14:
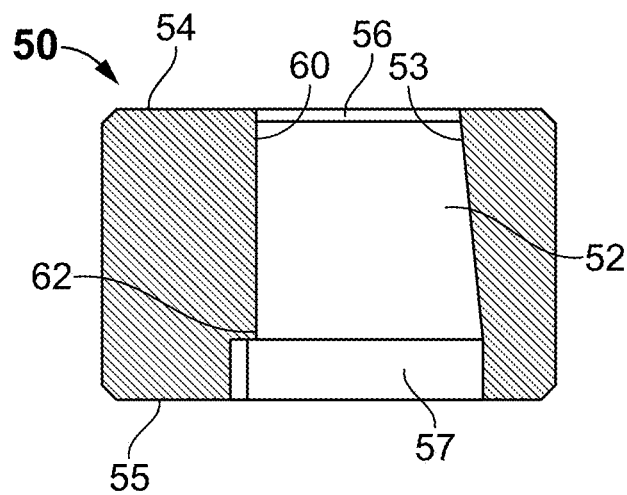
FIG. 14 is an enlarged side sectional view of the ferrule component, taken along section line A-A in FIG. 11.

Attention is advanced to FIGS. 8-10, showing details of the C-clip 70. The bottom view of the C-clip 70 in FIG. 8 shows that, viewed axially, the clip has a generally "C" shape defining a mouth 72 that opens radially in the side of the clip. As shall be explained, the mouth 72 permits the C-clip 70 to be inserted into the clip channel 30 in the locking pin 20, and around the minor shaft 28. The top 74 and the bottom 75 of the C-clip 70 preferably are planar and mutually parallel. A downward-facing ledge 73 surrounding the circumferential extent of the mouth 72 is defined in/on the interior wall of the C-clip 70, a modest distance (e.g., about 2.0 mm) above the bottom 75 of the clip. This ledge 73 receives the upper or inside surface of the head 24 of the locking pin 20 when the assembly 10 is fully assembled and at rest. As seen in FIGS. 9 and 10, the overall exterior contours of the C-clip 70 (apart from the void of the mouth 72) define a generally frustoconical shape. As suggested by FIG. 9, the exterior contours of the frustoconical C-clip 70 preferably but not necessarily define a mildly oblique frustum; in the oblique frustum, the vertex of the truncated cone is not directly opposite the center of a circle defined by the periphery of the C-clip's bottom 75. (Stated differently, an imaginary line representing the height of the (truncated) cone does not pass through the precise center of the base 75, but is slightly offset radially therefrom.) Nevertheless, all versions of the C-clip 70 feature an exterior wall that tapers inwardly upward from the bottom 75 of the clip towards its top 74. The exterior size and shape of the C-clip 70 correspond to the size and shape of the interior void defined by the clip bore 52 of the ferrule 50. As explained further hereinafter, the C-clip 70 thus is adapted for wedged insertion into the ferrule's C-clip bore 52.

Collective reference is made to FIGS. 11-14 illustrating the details of the ferrule 50, which may be formed from high-impact nylon or suitable alternative composition. The ferrule 50 is generally cylindrical with a planar top 54 and planar bottom 55. It is about 8.0 mm in axial length, for example, and may have an outside diameter, by way of example and not limitation, of approximately 12 mm. The ferrule 50 is completely penetrated axially by a clip bore 52. Notably, and referring particularly to the views of FIGS. 12 and 14, the clip bore 52 is not cylindrical. Rather, the bore 52 is a void having a generally frustoconical shape defined by the ferrule's interior wall 53. The top aperture or opening 56 of the bore 52 has a diameter modestly less than the diameter of the bore's bottom aperture or opening 57. For example only, the maximum diameter of the bore 52 at the bottom opening 57 may be about 9.0 mm, while the minimum diameter defined at the top opening 56 may be about 7.0 mm. It is seen therefore that the interior wall 53 tapers inwardly from the bottom 55 of the ferrule 50 toward the top 54. As previously mentioned, the frustoconical shape of the void of the bore 52, including that the frustum is mildly oblique, corresponds to the exterior contours and dimensions of the C-clip 70.

A longitudinal key 60 extends slightly (e.g., about 1.0 mm) radially into the bore 52 from the interior wall 53 of the ferrule 50. The key 60 occupies, for example between about 40 degrees and about 60 degrees of the 360-degree circumference of the clip bore 52. Its interior face (facing radially toward the bore axis) may be approximately planar, but preferably has a minor concave curvature complementary to the circumferential convex curvature of the major shaft 26. In one embodiment, the key 60 is about 3.0 mm in lateral extent. The key 60 runs axially along the interior wall 53 of the ferrule 50, extending from the top opening 56 downward, but stops about, for example, 2.0 mm short of the bottom opening 57. Thus, the key top 62 defines a small shelf within the clip bore 52 about, for example, 2.0 mm above the bottom 55 of the ferrule 50.

Figure 2:
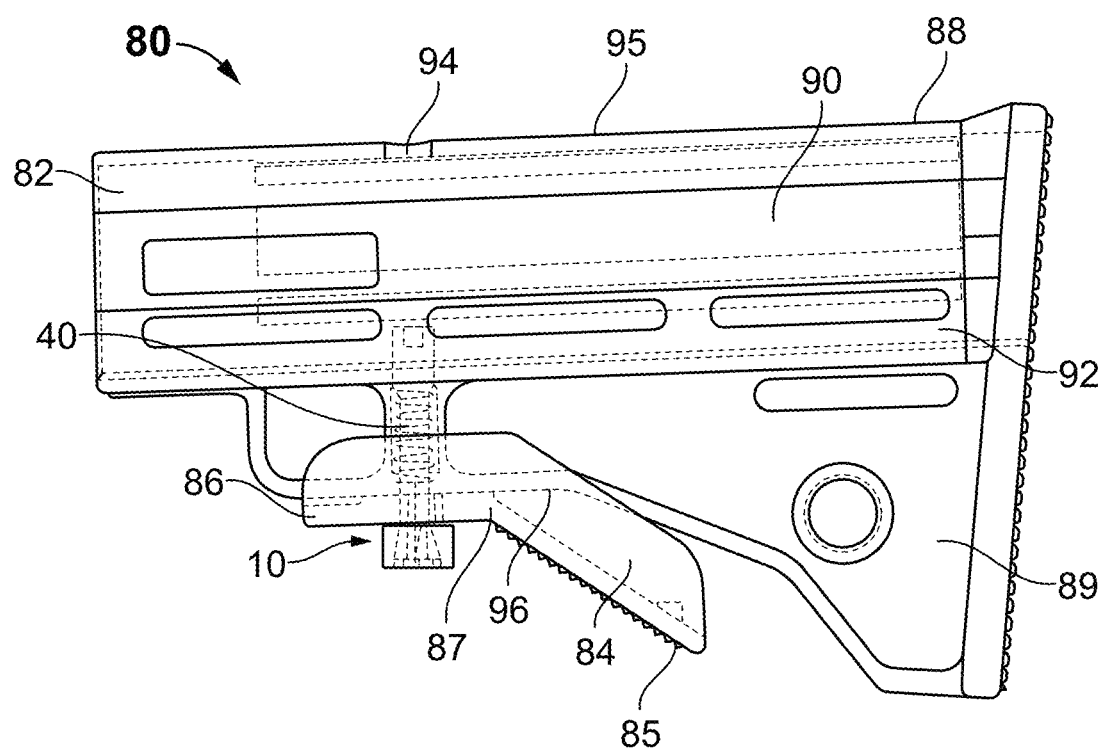
FIG. 2 is a left side view of the buttstock assembly seen in FIG. 1, with selected interior features depicted with phantom lines, and the rear of the buttstock is to the right in the figure.
Figure 3:
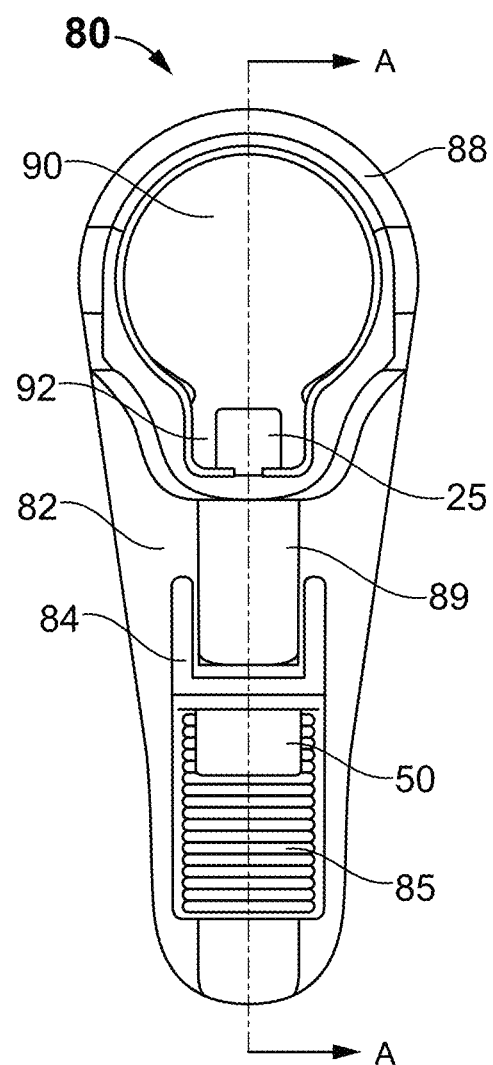
FIG. 3 is a front end view of the buttstock assembly seen in FIGS. 1 and 2.
Figure 4:
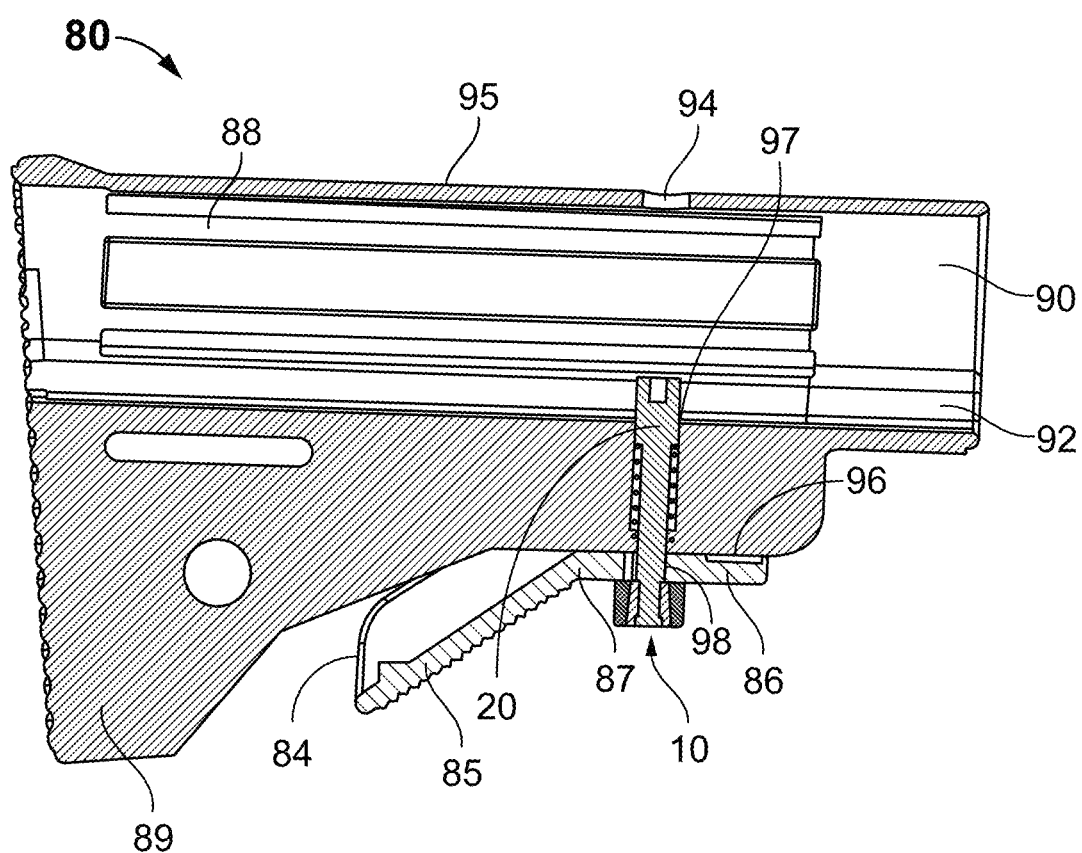
FIG. 4 is a right side sectional view of the buttstock assembly, taken along section line A-A of FIG. 3.

A mode for installing the locking pin assembly 10 in an adjustable buttstock assembly (as such buttstock assemblies are generally known), and its assembly for use, are now described. As is known in the art, there is a vertical hole 94 in the top 95 of an adjustable buttstock 80, used to place a locking pin assembly 10 into the stock. The buttstock top hole 94 has a diameter (e.g., approximately 9 mm) greater than the diameter of the cap 25 of the locking pin 20, such that the entire pin 20 can pass through the top hole. Vertically aligned with the top hole 94 in the buttstock 80 is a buttstock bottom hole 97 with a diameter (e.g., about 6 mm) that is less than the diameter of the buttstock's top hole 94, and in any event less than the diameter of the spring 40 (and the cap 25). Also at the bottom of the buttstock body is the release lever 84, which lever is penetrated by a pin aperture 98 having a diameter exceeding the diameter of the locking pin's major shaft 26, but which is less than the diameter of the ferrule 50; for example, the release lever's pin aperture 98 may have a diameter of about 7 mm. The buttstock top hole 94, buttstock bottom hole 97, and the pin aperture 98 in the release lever are coaxially aligned, as indicated in FIGS. 2-4.

Prior to installation, the locking pin assembly 10 appears generally as seen in FIG. 17; that is, the uncompressed spring 40 is disposed around the locking pin's stem, usually the major shaft 26 of the locking pin 20, with the spring on or near the annular seat 32. At this outset, the ferrule 50 and C-clip 70 are not engaged with the locking pin 20, but are separately situated and held for use. In one possible mode of installing the locking pin assembly 10 into an adjustable buttstock assembly, the adjustable buttstock 80 is inverted, and the locking pin 20 (with compression spring 40 thereon) is inverted (i.e., with the pin's second end 23 downward) and inserted upwardly through the top hole 94 of the buttstock 80. (The inversion of the locking pin 20 causes the spring 40 to remain by gravity upon the locking pin.) This insertion may be facilitated by the use of a thin tool, such the tip of an awl or rigid wire, releasably engaged into the tool aperture 36 in the cap 25 of the locking pin assembly. The insertion of the locking pin 20 and spring 40 is continued until the bottom end of the spring 40 (which at this junction is actually upward within the tube of the buttstock 80) contacts an interior wall of the buttstock (e.g., the narrowed diameter of the buttstock's bottom hole 97). Pin insertion is continued as the head 24, minor shaft 28, and major shaft 26 are controllably passed through the buttstock's bottom hole 97 and the release lever's pin aperture 98. The ongoing insertion of the locking pin 20 occurs against the action of the spring 40, as the spring is now compressed between the interior wall of the buttstock's extension tunnel 90 and the annular seat 32 of the pin 20, whose cap 25 moves toward the buttstock's interior wall. This forced translation of the locking pin 20 continues (against the continued compression of the spring 40) while the first end 22 of the pin (with the head 24) passes through the pin aperture 98 in the release lever 84.

The inserting movement is still continued until the keyway 34 on the pin 20 has emerged and is fully exposed out of (at this time, above) the release lever's pin aperture 98. At this point, the cap 25 on the second end 23 of the locking pin 20 may be received mostly or fully within a cylindrical well or cavity defined in the bottom groove 92 of the buttstock tunnel 90. The locking pin 20 and the spring 40 (the latter held in compression) are maintained in this position on the buttstock 80 pending complete assembly of the locking pin assembly 10. (The use of auxiliary jigs or clips to temporarily maintain the compression of the spring 40 and the extended condition of the locking pin 20 may permit the buttstock 80 to be inverted again (i.e., turned right-side up) while the locking pin assembly 10 is completed.)

This disclosure is continued with the understanding that the top 95 of the buttstock 80 now is upward, and with the first end 22 (and head 24) of the locking pin 20 projecting downward, oriented as seen in FIGS. 17-19. The buttstock 80 and release lever 84 are omitted from FIGS. 17-19 for the sake of clarity of illustration; it is understood that the bottom wall of the buttstock body 82 and the release lever 84 (which are in adjacent contact) will be disposed between the top 54 of the ferrule 50 and the bottom of the spring 40 in FIGS. 17-19. Again, FIGS. 1-4 show the locking pin assembly 10 installed for use within the buttstock assembly 80 configured and assembled for use.

Referring to FIGS. 7 and 18, with the spring 40 compressed and the keyway 34 exposed below the release lever 84, the ferrule 50 is placed on the first end 22 of the locking pin 20. As seen in FIG. 1, the ferrule's key 60 is aligned with the locking pin's keyway 34. As also seen in FIG. 18, the ferrule 50 is slipped over and past the head 24 of the locking pin 20, with the first end 22 of the pin being inserted through the ferrule's clip bore 52, the ferrule key 60 in aligned registration with the locking pin keyway 34, and the ferrule 50 arranged circumferentially around the pin's major shaft 26. The ferrule 50 is moved upward (referring also to FIG. 7) to place its top 54 near or into contact with the lower end of the spring 40.

With the locking pin 20 and ferrule 50 arranged as seen in FIG. 18, the C-clip 70 is clipped into place upon the minor shaft 28 of the locking pin. The C-clip 20, when installed, functions to secure the ferrule 50 against axial separation from the first end 22 of the locking pin 20. FIG. 19 indicates that installation of the C-clip 70 upon the locking pin 20 is accomplished by pushing the locking pin's minor shaft 28 into the mouth 72 of the C-clip 70. (Or, perhaps more particularly, the C-clip 70 is engaged around the minor shaft 28.)

FIGS. 18-19 show that, properly positioned for engagement with the minor shaft 28, the C-clip's open mouth 72 is disposed diametrically opposite the ferrule's key 60, such that the distal lips of the C-clip are arranged on opposite (circumferential) sides of the key 60. Because the outside diameter of the minor shaft 28 exceeds the distance between the distal lips of the mouth 72 of the elastically resilient C-clip 72, the C-clip "snaps" into releasable but reliable engagement in the pin's clip channel 30, with the C-clip snuggly surrounding most of the circumference of the minor shaft 28. When the locking pin assembly 10 is completely assembled, each of the two lips of the C-clip 70 preferably is drawn adjacent to a lateral side of the key 60.

When the C-clip 70 is fully installed upon the locking pin 20, the annular upper surface of the locking pin head 24 contacts against the C-clip's circumferential interior ledge 73. This engagement of the head 24 with the ledge 73 assists in securing the C-clip 70 against being inadvertently pushed or pulled axially off the first end of the locking pin 20. Moreover, in a finished assembly of the locking pin assembly 10, the upper surface of the locking pin head 24 contacts against the top 62 of the key 60 inside the ferrule 50.

With the C-clip 70 disposed in the locking pin's clip channel 30, the potential energy of the compressed spring 40 is deliberately released by a user. The action of the spring 40, which is compressed between the locking pin's annular seat 32 and an inside bottom wall of the buttstock body 82, pulls the entire locking pin assembly 10 (upward) toward the buttstock assembly 80, and more particularly draws the ferrule 50 toward the outer bottom surface of the release lever 84. This pulling action, particularly after the top 54 of the ferrule 50 contacts the bottom of the release lever 84, also urges the C-clip 70 into the ferrule's clip bore 52. The potential energy of the compressed spring 40 thereafter maintains the locking pin assembly 10 in a use configuration upon the buttstock assembly 80.

The foregoing essentially completes the installation of the locking pin assembly 10 on the adjustable buttstock. The assembly 10 (minus the spring 40) is arranged as seen in FIG. 5, with the cap 25 situated within the groove 92, well or cavity defined in the bottom wall of the tunnel 90 of buttstock body 82. Most of the axial length of the locking pin 20 is within the interior of the buttstock body 82 and release lever 84, with only its first end 22 extending below the bottom of the release lever. The top 54 of the ferrule 50 abuts the bottom of the release lever 84, and is held in such abutting contact by the ongoing compressive action of the spring 40 (which is inside the buttstock). Locking pin assembly 10 is thus configured for use in cooperation with the buttstock assembly 80, including the release lever 84.

An advantage of the invention is the elimination from the locking pin assembly 10 of any threaded components with screwed engagement. Screw threading is a relatively expensive machining process. Threaded nuts and pins known in the art can be difficult to engage/disengage without damaging the components.

When the locking pin assembly 10 is fully assembled and installed on a buttstock assembly, the C-clip 70 is inserted, wedge-like, into the ferrule 50 via the ferrule's bottom opening 57. As explained previously, the overall exterior contours of the C-clip 70 complement the interior contours of the ferrule's clip bore 52, so that the C-clip mates snugly within the bore 52. Additional reference is made to FIGS. 15-16 in these regards, showing the inter-arrangement of the C-clip 70 within the ferrule 50 (the locking pin 20 omitted from FIGS. 15 and 17 for clarity of illustration). When the ferrule 50 and C-clip 70 are configured to releasably hold the locking pin 20 in place on the adjustable buttstock assembly 80, the bottom surface 75 of the C-clip 70 preferably is substantially flush with the bottom 55 of the ferrule. The top 54 of the ferrule 50 is contactable with the release lever 84, due to the action of the spring 40, but the presence of the C-clip 70—which is securely snapped within the clip channel 30 of the locking pin 20—prevents the ferrule from being pushed off the second end 22 of the locking pin. The concurrent action of the spring 40 drawing upward the pin 20 toward the buttstock assembly, accordingly pulls the C-clip 70 axially upward for wedgeable insertion into the clip bore 52 from the ferrule's wider bottom opening 57 toward its narrower top opening 56. But because the C-clip 70 cannot pass through the ferrule's top opening 56, the C-clip 70 is retained reliably within the ferrule 50 in the positions seen in FIGS. 15 and 16.

Figure 15:
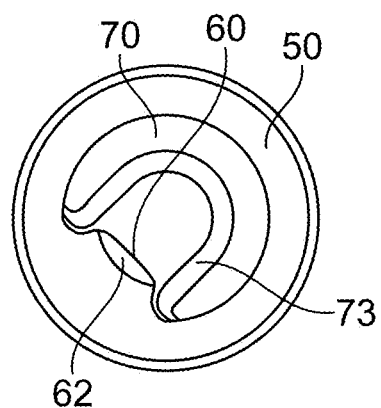
FIG. 15 is a bottom view of the ferrule component with the C-clip component seated therein, but omitting the locking pin.
Figure 16:
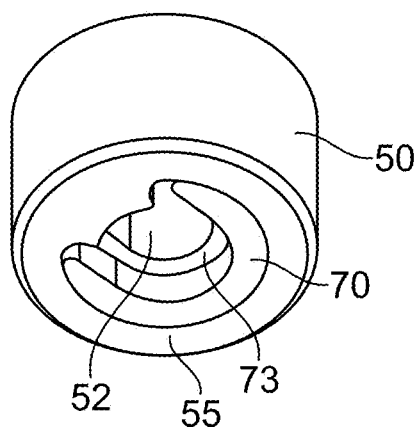
FIG. 16 is a perspective view of the bottom of the ferrule component with the C-clip component seated therein, but omitting the locking pin.

Also seen in FIGS. 15 and 16 is the ledge 73 inside the C-clip 70 upon which the head 24 of the locking pin 20 abuts in the finished assembly configured for use in a buttstock. The contact between periphery of the head 24 and the ledge 23 permits spring force to be transmitted from the pin 20 to the C-clip 70, and prevents the first end 22 of the locking pin from being pulled through the C-clip. FIG. 15 also reveals the ledge-like key top 62 of the ferrule 50. When the C-clip 70 is fully seated within the bore 52 of the ferrule 50 as seen in FIGS. 15 and 16, the key top 62 is at approximately the same axial position or elevation as the C-clip's ledge 73. This alignment permits the top of the pin head 24 to abut the key top 62 concurrently with the contact between the head 24 and the ledge 73. When the locking pin assembly 10 is in use, the periphery of the locking pin's head 24 thus is circumferentially abutted by the C-clip's ledge 23 and (for a comparatively minor arcuate length) the ferrule's key top 62.

Attention is returned to FIG. 5 (a bottom perspective view) and FIG. 6 (a top perspective view) showing the locking pin assembly 10 (minus the spring 40) configured for use. It is noted that the operative engagement between the locking pin's keyway 34 and the ferrule's key 60 serves to limit rotary movement of the ferrule 50 around the locking pin 20, while nevertheless fostering axial placement of the ferrule upon the first end 22 of the locking pin. The releasable but reliable situation of the C-clip 70 in the locking pin's clip channel 30 (between the head 24 and the step 29) prevents the C-clip from significant axial shifting along the locking pin 20. Finally, the wedged insertion of the frusto-conical C-clip 70 within the correspondingly shaped bore 52 of the ferrule 50 prevents the ferrule from separating axially from the first end of the locking pin 20.

If and when it may be desired to remove the locking pin assembly 10 from the buttstock assembly, the installation steps disclosed hereinabove are generally performed in reverse order. Removal of the locking pin assembly 10 may be indicated for purposes of cleaning the assemblies, removal/replacement of the release lever, or replacement of components of the locking pin assembly itself.

To remove the locking pin assembly 10 from the buttstock assembly, a thin tool (again, a stiff wire is usually suitable) is inserted through the buttstock's top hole 94 and pressed against the top of the cap 25 (within the buttstock), e.g., engaged with the tool aperture 36. With the buttstock 80 maintained in place, the locking pin 20 is then pushed downward to shift the ferrule 50 away from the bottom of the release lever 84 (which exposes a segment of the major shaft 26). The ferrule 50 is then shifted (for instance, manually as grasped between the user's two fingers) upward axially along the exposed segment of the major shaft 26. This movement of the ferrule 50, with the locking pin 20 still held against movement, exposes the C-clip 70 from within the ferrule's clip bore 52. The C-clip 70 is then disengaged from the locking pin's clip channel 30, and is removed from the locking pin 20. With the C-clip 70 removed entirely from the locking pin 20, the ferrule 50 is removed from the first end of the locking pin 20 by slipping in it over and past the head 24. Absent the ferrule 50, the locking pin 20 and spring 40 are readily withdrawn from the interior of the buttstock assembly.

Only some embodiments of the invention and but a few examples of its versatility are described in the present disclosure. In this disclosure, "approximately," or "about," when referring to a dimension, means plus or minus 10%, e.g., "approximately 10 mm" encompasses a range of 9.0 mm to 11 mm inclusive. It is understood that the invention is capable of use in various other combinations and is capable of changes or modifications within the scope of the inventive concepts expressed herein. Thus, although the invention has been described in detail with particular reference to these preferred embodiments, other embodiments can achieve the same results. Variations and modifications of the present invention will be obvious to those skilled in the art and it is intended to cover with the appended claims all such modifications and equivalents. The entire disclosures of the patents cited hereinabove are hereby incorporated by reference.

What is claimed is:

1. A locking pin assembly adapted for use with an adjustable buttstock assembly, the locking pin assembly comprising:
   a locking pin comprising:
      a first end having a discoid head;
      a second end having a cap;

a stem extending between the head and cap, the stem comprising a major shaft adjoining the cap and a minor shaft adjoining the head, the major shaft being coaxially integral with the minor shaft, a diameter of the major shaft exceeding a diameter of the minor shaft, wherein the diametrical transition between the major and minor shafts defines a step;

a circumferential clip channel defined between the head and the step; and a planar keyway on the major shaft extending from the step toward the cap.

2. The locking pin assembly according to claim 1 wherein the cap has a diameter greater than the diameter of the major shaft wherein a diametrical transition between the major shaft and the cap defines an annular seat.

3. The locking pin assembly according to claim 1, further comprising a C-clip defining a mouth opening radially in a side of the clip, whereby the C-clip is insertable into the clip channel and around the minor shaft.

4. The locking pin assembly according to claim 3 wherein the C-clip further comprises:
a planar top;
a planar bottom parallel to the top; and
exterior contours defining a frustoconical shape.

5. The locking pin assembly according to claim 4 wherein the C-clip further comprises:
an interior wall; and
a downward-facing ledge, defined on the interior wall a distance above the clip bottom, for receiving an inside surface of the head.

6. The locking pin assembly according to claim 4 wherein the exterior contours of the C-clip define an oblique frustum.

7. The locking pin assembly according to claim 4, further comprising a cylindrical ferrule penetrated axially by a clip bore, wherein the ferrule comprises a ferrule interior wall defining a void of the clip bore having a frustoconical shape corresponding to the exterior contours of the C-clip.

8. The locking pin assembly according to claim 4 wherein the C-clip and the ferrule comprise a polymer.

9. The locking pin assembly according to claim 7, the ferrule further comprising:
a planar top having a top opening therein; and
a planar bottom having a bottom opening therein;
wherein the ferrule interior wall tapers inwardly from the bottom of the ferrule toward the top.

10. The locking pin assembly according to claim 9, the ferrule further comprising a longitudinal key extending radially from the ferrule interior wall into the clip bore, running axially along the ferrule interior wall downward from the top of the ferrule, and alignable with the locking pin keyway.

11. A locking pin assembly adapted for use with an adjustable buttstock assembly, the locking pin assembly comprising:
a locking pin comprising:
a first end having a head;
a second end having a cap;
a stem extending between the head and cap;
a circumferential clip channel defined in the stem; and
a planar keyway on the stem;
a ferrule penetrated axially by a clip bore, the ferrule disposable around the first end of the locking pin;
a spring disposable around the stem; and
a C-clip defining a mouth in a side of the clip, whereby the C-clip is insertable into the clip channel and around the stem, and wherein the C-clip is insertable into the clip bore.

12. The assembly according to claim 11 wherein:
the locking pin stem comprises a major shaft adjoining the cap and a minor shaft adjoining the head, the major shaft being coaxially integral with the minor shaft, a diameter of the major shaft exceeding a diameter of the minor shaft, wherein the diametrical transition between the major and minor shafts defines a step;
the circumferential clip channel is defined between the head and the step; and
the planar keyway is on the major shaft extending from the step toward the cap.

13. The assembly according to claim 12 wherein the ferrule further comprises:
a top having a top opening of the clip bore;
a bottom having a bottom opening of the clip bore; and
a ferrule interior wall around the clip bore and extending between the ferrule top and the ferrule bottom, wherein the ferrule interior wall tapers inwardly from the ferrule bottom toward the ferrule top to define a frustoconical shape of the clip bore.

14. The assembly according to claim 13, the ferrule further comprising a longitudinal key extending radially into the clip bore, running axially along the ferrule interior wall downward from the top of the ferrule, and alignable with the locking pin keyway.

15. The assembly according to claim 14 wherein the C-clip further comprises:
a planar top;
a planar bottom parallel to the top; and
exterior contours defining a frustoconical shape corresponding to the frustoconical shape of the clip bore;
wherein the C-clip is wedgeably insertable into the clip bore.

16. The assembly according to claim 15 wherein the C-clip further comprises a downward-facing ledge defined on the C-clip's interior wall a distance above the bottom of the clip, for receiving thereon an inside surface of the head when the assembly is configured for use.

17. The assembly according to claim 16 wherein the inside surface of the head contacts against a top of the key inside the ferrule when the assembly is configured for use.

18. The assembly according to claim 15 wherein the cap has a diameter greater than the diameter of the major shaft, wherein a diametrical transition between the major shaft and the cap defines an annular seat upon which an end of the spring is received when the assembly is configured for use.

19. The assembly according to claim 15 wherein the C-clip is composed of nylon.

20. The assembly according to claim 15 wherein the ferrule is composed of nylon.

* * * * *